(12) United States Patent
Page

(10) Patent No.: US 6,223,089 B1
(45) Date of Patent: Apr. 24, 2001

(54) METHOD AND APPARATUS FOR CONTROLLING COMPUTERS REMOTELY

(75) Inventor: Raymond T. Page, Austin, TX (US)

(73) Assignee: Raylar Design, Inc., Pflugerville, TX (US)

( * ) Notice: Subject to any disclaimer, the term of this patent is extended or adjusted under 35 U.S.C. 154(b) by 0 days.

(21) Appl. No.: 09/268,247

(22) Filed: Mar. 15, 1999

(51) Int. Cl.[7] .................................................. G05B 15/02
(52) U.S. Cl. ........................................... 700/9; 714/48
(58) Field of Search .............................. 700/2–3, 7, 9, 700/78, 79; 714/48

(56) References Cited

U.S. PATENT DOCUMENTS

| | | | |
|---|---|---|---|
| 4,283,773 | * 8/1981 | Daughton et al. ..................... 700/3 |
| 5,095,280 | * 3/1992 | Wunner et al. ..................... 327/145 |
| 5,398,048 | * 3/1995 | O'Mahony ........................... 345/212 |
| 5,550,979 | * 8/1996 | Tanaka et al. ....................... 709/209 |
| 5,581,279 | * 12/1996 | Chang et al. ....................... 345/190 |
| 5,739,760 | * 4/1998 | Hatakeyama ................... 340/825.15 |
| 5,805,797 | * 9/1998 | Sato et al. ............................. 714/48 |
| 5,822,615 | * 10/1998 | Yamashita et al. ................... 710/10 |
| 5,987,543 | * 11/1999 | Smith .................................... 710/70 |
| 6,018,810 | * 1/2000 | Olarig .................................... 714/43 |

\* cited by examiner

*Primary Examiner*—William Grant
*Assistant Examiner*—Zoila Cabrera
(74) *Attorney, Agent, or Firm*—Bernard L. Kleinke; Foley & Lardner

(57) ABSTRACT

The inventive method and apparatus for enabling an operator terminal to control remotely a computer system enables data to be transmitted over long distances in a highly stable manner by deleting a message if a mismatch occurs between the data and error checking information contained in the received data. The computer is then subsequently returned to its last valid state to prevent the system from inadvertently becoming disrupted either by the terminal or the computer being disconnected from the transmission line during an idle condition of the system, or by invalid data being received, such as where the transmission line becomes disrupted inadvertently. A voltage controlled oscillator generates a stable reference clock signal, and a phase detector responds to the stable reference clock signal and to the pixel clock signal for, in turn, controlling the oscillator. Such a stable reference clock signal enables a high volume of information to be transmitted over the high speed transmission line, without being adversely affected by phase noise or jitter.

20 Claims, 6 Drawing Sheets

METHOD AND APPARATUS FOR CONTROLLING COMPUTERS REMOTELY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a method and apparatus for controlling computers remotely. The invention more particularly relates to a computer being controlled remotely by an operator terminal via a high speed fiber-optic transmission line.

2. Background Art

In many applications, data security for computers is of paramount importance. For example, computers used on factory floors, hospitals, financial institutions, public venues, refineries and other such applications oftentimes present issues relating to the security of the data being processed. Also, the environment may not be suitable for the use of the computers where it may be difficult or impossible to maintain a proper operating environment relative to temperature and humidity.

Therefore, it has been proposed to have the computer disposed in a safe and controlled environment, and have one or more operator terminals located remotely from the computer at a position where the user can enter and receive information interactively with the computer. In this regard, the computer can then be secured in a safe, air-conditioned location away from the environment where the operator terminal can still communicate with the computer.

There can be many applications where the operator terminal must be located at a great distance from the computer. For example, it may be desirable to have the operator terminal located at a position many kilometers apart from the computer. At such great distances, it becomes important to have a high speed transmission link such as a fiber-optic transmission line interconnect one or more of the operator terminals with the remotely located computer. High speed transmission links require a very stable (low jitter or phase noise reference clock.) As a result, such a system can be inherently unstable in its data transfer over the fiber-optic transmission line. More specifically, for example, if a 40 bit data word is used, an additional eight bits of link management and protocol information must be added to each data word, for a total of 48 bits. If the system is to operate at a 32.5 MHz clock speed, then the system must operate at 1.569 GHz (32.5 MHz times 48 bits). The period for such a rate would then be 0.637 Nano seconds. If the phase noise or jitter is equal to about one Nano seconds, the period for transmitting the information would actually be less than the period for the jitter, thereby resulting in a totally unacceptable and inherently unstable system.

Therefore, in order to have a long distance remotely controllable computer system over high speed fiber-optic transmission lines, it would be necessary to have a method and apparatus which would be able to transmit information in a highly stable and reliable manner.

Additionally, with such a remotely controllable system, it is also important that the system be highly reliable to maintain the integrity of the data. In this regard, special consideration must be made to ensure that the fiber-optic connection is "hot-pluggable." This means that the fiber-optic connection should be able to be disconnected from a failed or failing computer and then connected to a back-up computer without the need for rebooting either computer. This feature would also be useful when upgrading software and/or hardware. Similarly, it would be desirable to disconnect an operator terminal, or connect one to the transmission line without disrupting the operation of the computer. Additionally, especially where long distances are encountered, it would be desirable to prevent the computer from requiring rebooting should the fiber-optic transmission line be disrupted or severed inadvertently.

Thus, it would be highly desirable to have such a new and improved method and apparatus for controlling a computer remotely, even at long distances, while enabling either the computer or the operator terminal to be disconnected from the fiber-optic transmission line, or the transmission line becoming inadvertently disabled, without interrupting or otherwise disturbing the computer in a "hot pluggable" manner.

SUMMARY OF THE INVENTION

The above and further objects of the present invention are realized by providing a new and improved method and apparatus for controlling remotely a computer, wherein the computer can continue to operate efficiently and effectively even in adverse conditions and where the computer and one or more of its operator terminals are spaced apart physically at great distances.

Another object of the present invention is to provide such a new and improved method and apparatus for controlling remotely a computer, wherein the system apparatus a fiber-optic transmission line and yet is able to communicate between the computer and a remotely located operator terminal by transmitting stable data.

A further object of the present invention is to provide such a new and improved method and apparatus for controlling remotely a computer, wherein either the computer or the operator terminal can be disconnected from the fiber-optic transmission line, or the line itself be damaged or otherwise disabled inadvertently, without substantially interrupting the operation of the computer.

Briefly, the above and further objects of the present invention are realized by providing such a new and improved method and apparatus for controlling remotely a computer by an operator terminal over a high speed transmission line, such as a fiber-optic transmission line, wherein the data is able to be transmitted in a highly stable manner. Also, such method and apparatus should enable the computer to continue functioning without any substantial interruption, even when the computer or the operator terminal is disconnected from the fiber-optic transmission line, or the line itself becomes damaged or severed inadvertently.

The inventive method and apparatus for enabling an operator terminal to control remotely a computer system enables data to be transmitted over long distances in a highly stable manner by deleting a message if a mismatch occurs between the data and error checking information contained in the received data. The computer is then subsequently returned to its last valid state to prevent the system from inadvertently becoming disrupted either by the terminal or the computer being disconnected from the transmission line during an idle condition of the system, or by spurious data containing messages being received, such as where the transmission line becomes disrupted inadvertently. A voltage controlled oscillator generates a stable reference clock signal, and a phase detector responds to the stable reference clock signal and to the pixel clock signal for, in turn, controlling the oscillator. Such a stable reference clock signal enables a high volume of information to be transmitted over the high speed transmission line, without being adversely affected by phase noise or jitter.

One advantage of the present inventive system is that the fiber-optic transmission line link is transparent to the operating system of the computer. The computers operating system sees the transmission line system as a simple flat panel video controller and two standard serial ports of the operator terminal. The computer does not "know," nor does it need to know, that the display and serial port terminations may be several kilometers away from the computer. Thus, the user can install conventional software drivers that typically are supplied with the operating system.

Video controllers that are designed to drive conventional flat panel displays must use firmware (video BIOS) which is specific for the timing and data-format requirements of the target display. A non-volatile memory device, such as an EPROM, is conventionally used to store this information. Typically, the EPROM has to be physically replaced with one containing the appropriate configuration information when a different display is used. The inventive system, on the other hand, can employ memory that has sixteen-times (32 KB ×16=512 KB) the memory capacity of a conventional video BIOS EPROM, and thus, has the ability to store sixteen different display configurations, which can be switch-selected, thereby eliminating the need to physically replace the EPROM.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
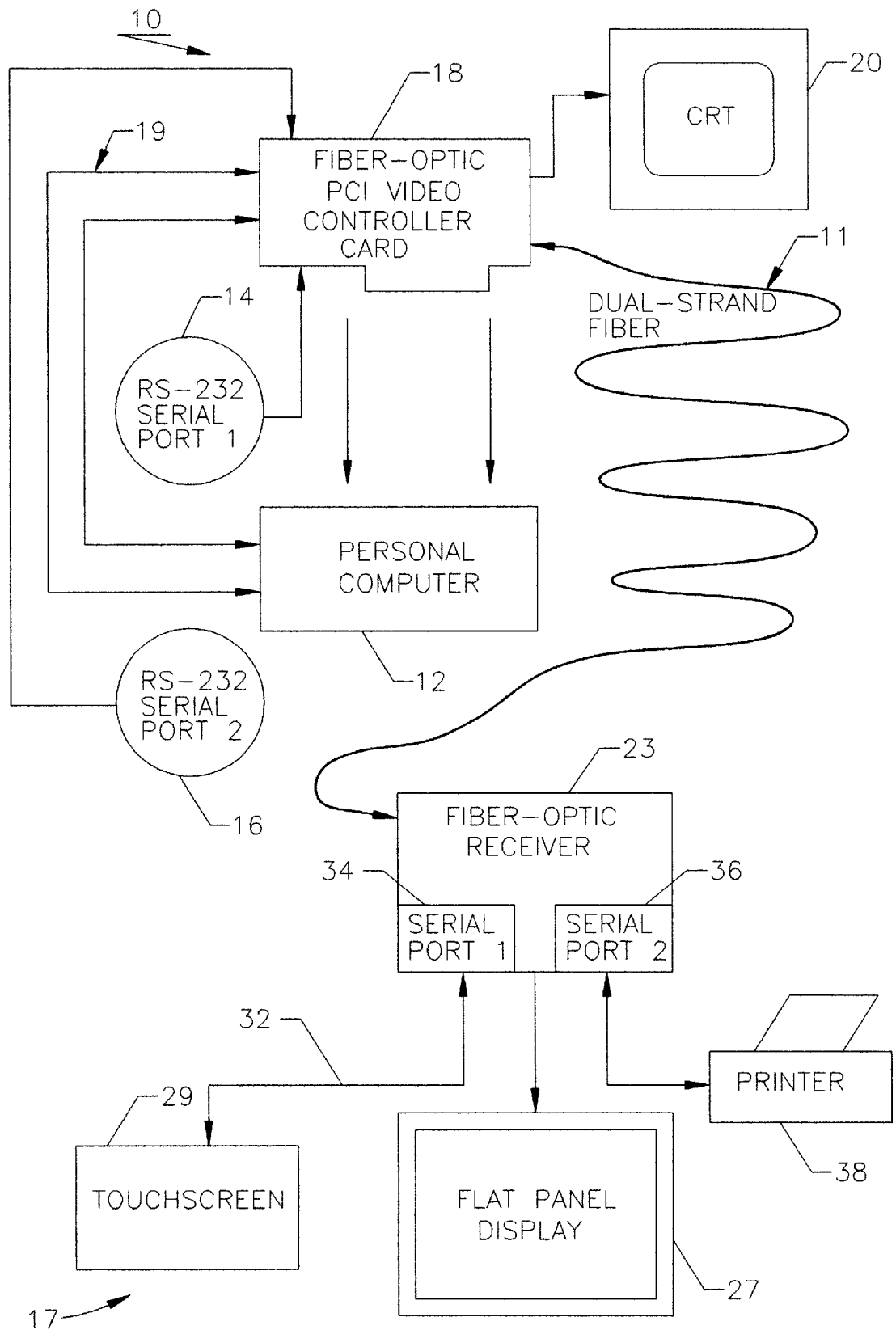
FIG. 1 is a block diagram of the remotely controlled computer which is constructed in accordance with the present invention.

Referring now to the drawings, and more particularly to FIG. 1 thereof, there is shown a fiber-optic digital computer graphics transmission system 10 for transmitting video and data over a full-duplex high-band width fiber-optic transmission line 11 between a personal computer 12 having a pair of associated serial ports 14 and 16 by means of a remotely located operator terminal generally indicated at 17.

The inventive system 10 enables the computer 12 to be controlled, even though the operator terminal 17 is located many kilometers apart from the personal computer 12. Thus, the computer 12 can be located in a secure location which has a controlled environment for air-conditioning and humidity, even though the operator terminal 17 may be located in a more hostile environment.

The system 10 includes a PCI fiber-optic video controller card or board 18 which is mounted in the personal computer 12 and which enables the personal computer 12 to communicate via the fiber-optic transmission line 11. The controller card 18 is adapted to be mounted inside the personal computer 12 in a convenient manner as indicated by the arrow shown in FIG. 1, and is connected electrically thereto by means of a cable 19. A cathode ray tube display 20 is also connected to the controller card 18 to provide a local display for the personal computer 12.

The "transmission system" integrates video controller functions, serial port connections and fiber-optic link transmitter/receiver functions onto a single PCI 2.1 compatible printed circuit board 18. No additional internal or external printed circuit boards are required at the computer end of the link to realize a video-over-fiber solution.

A fiber-optic receiver 23 of the operator terminal 17 communicates via the fiber-optic transmission line 11 with the controller card 18. The operator terminal 17 includes a flat panel display 27, which is provided with a touch screen 29 connected by a cable 32 to a serial port 34 for the receiver 23, so that the user can enter information at the flat panel display 27 for communicating interactively via the fiber-optic transmission line 11 with the controller 18. A serial port 36 is also connected to the fiber-optic receiver 23 for enabling a peripheral unit, such as the printer 38 to be operated remotely via the fiber-optic transmission line 11.

The 1.6 Gbps full-duplex fiber-optic link 11 connects the PCI card to the receiver 23. The full-duplex nature of the link enables the transportation of two RS-232 serial ports to the remote location.

Figure 2:
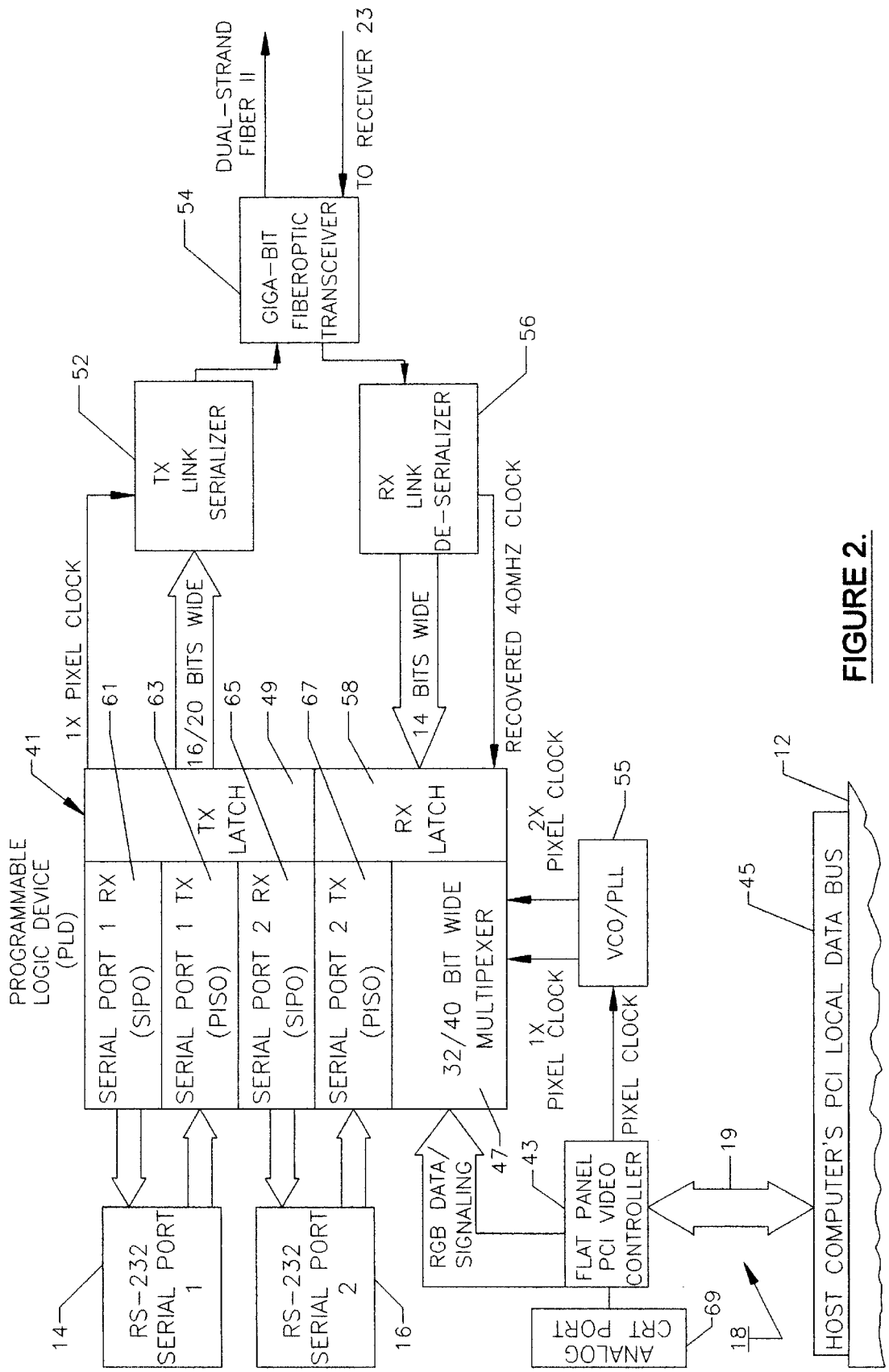
FIG. 2 is a block diagram of a fiber-optic controller card the computer system of FIG. 1.

Considering now the fiber-optic controller 18 with reference to FIG. 2, the controller 18 generally comprises a programmable logic device 41 which communicates with a flat panel PCI video controller 43 for receiving RGB data/signaling from the host computer PCI local data bus 45 of the computer 12 to supply it to a multiplex logic 47 of the programmable logic device 41. A transmission latch 49 of the device 41 temporarily stores the RGB data/signaling information for transmission via a transmission link serializer 52 and a Giga-bit fiber-optic transceiver 54 to the fiber-optic transmission line 11.

In order to stabilize the data being transmitted over the fiber-optic transmission line 11 to the receiver 23, a voltage controlled oscillator/phase lock loop 55 derives a pair of reference pixel clock signals which are one and two times the pixel clock of the video controller 43, and supplies them to the multiplexer logic 47 of the device 41 so that the data being sent over the transmission line 11 is stable even at the transmission speeds and the amount of data being transmitted.

A link de-serializer 56 receives information from the transmission line 11 via the transceiver 54 and supplies it to a receiver latch 58 of the device 41.

The serial ports 14 and 16 are connected to the programmable logic device 41 to enable the ports to communicate with a receiving serial port 61 and a transmitting serial port 63 of the programmable logic device 41. The serial port 16 communicates with a receiving serial port 65 and a transmitting serial port 67 of the device 41. An analog cathode ray tube port 69 communicates with the video controller 43 to enable the cathode ray tube 20 to be connected thereto.

The PCI video controller card 18 uses a Chips and Technologies 65555 PCI video controller IC 43 to perform high performance multimedia flat panel/CRT GUI acceleration. However, the inventive system will operate with other conventional video controllers. Instead of connecting directly to a flat panel, the display data coming from the 65555 controller 43 is intercepted by the programmable logic device 41. The device 41 formats the data to either a 32 or 40 bit wide link transmission word format, which is required by the link serialization chip 52. Whether to use either a 32 or 40 bit wide word is determined by the selected flat panel display data format.

Two full hardware-handshaking RS-232 ports are transported through the link by connecting them at the PCI board. The PCI board does not "create" the serial ports, it simply acts as a conduit to pass existing serial ports; Signals associated with the serial ports that must be transmitted to the receiver are multiplexed down to two of the bits of the 32/40 bit wide link transmission word. A similar process is used for the return path for the serial ports.

The phase-locked loop 55 is used to clean up the pixel clock coming from the 65555 controller 43 before it is used as the reference clock for the fiber-optic link. A clock source that is exactly twice the frequency of the pixel clock is also generated and used in the device 41 to register and latch data.

Although the link transmission word size can be set to either 32 or 40 bits, the 52 transmitter link serializer 52 can only accept 16 or 20 bit words at a time. In order to transport 32/40 bit words down the link, the link serializer 52 must be configured for double-frame mode (2×16/20 words). Once the data is in the 16/20 bit double-frame format, it is sent to the link serializer 52 where the parallel word is serialized and sent to the fiber-optic transceiver at Giga-bit data rates. The fiber-optic transceiver 54 converts this data stream to light and sends the data down the fiber optic transmission line 11 to the receiver 23.

At the same time, the fiber-optic transceiver is receiving data from the remote receiver 23. The returning data is converted into parallel data by the RX link de-serializer 56 and sent to the device 41 for further processing.

Figure 3:
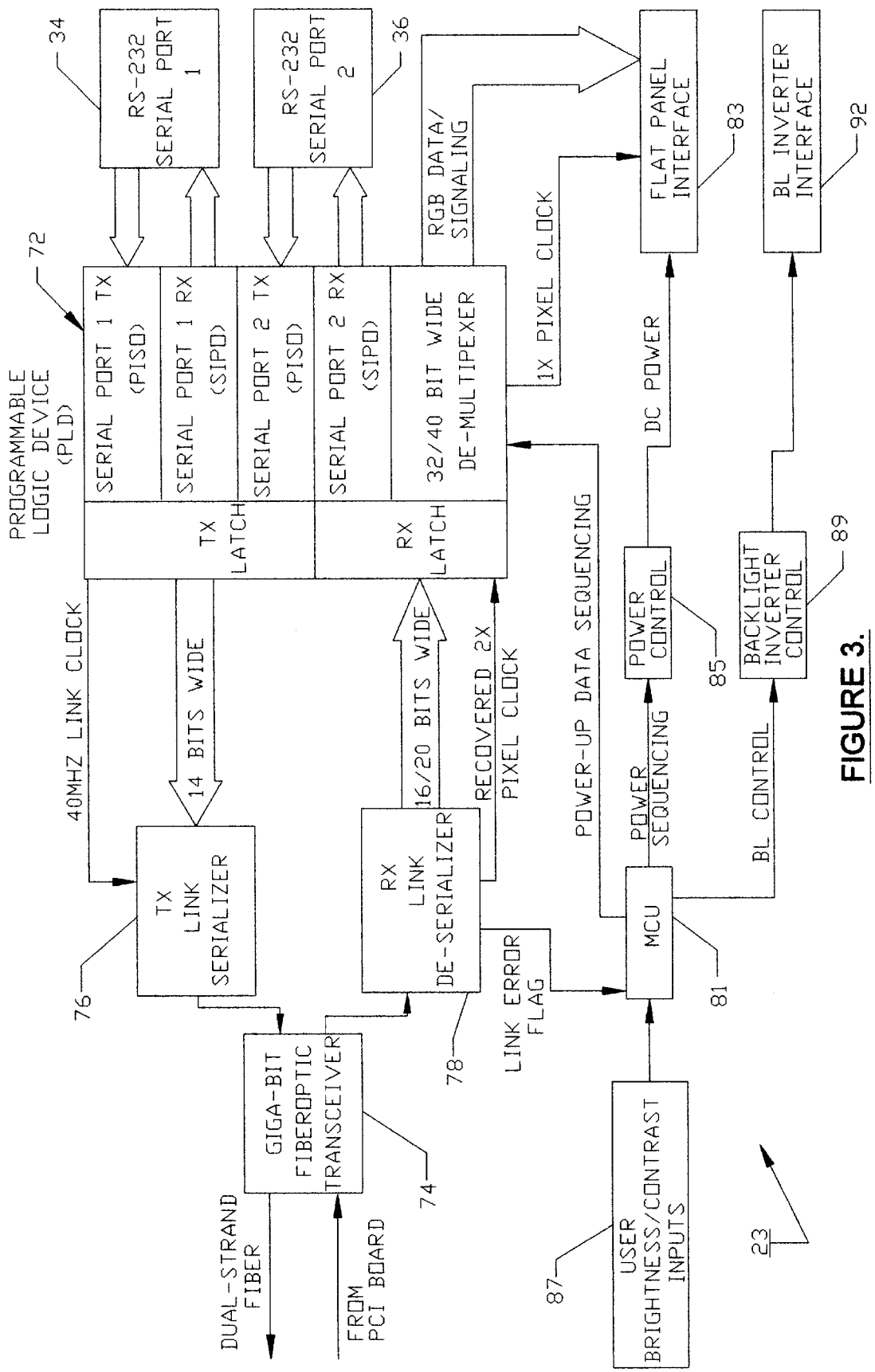
FIG. 3 is a block diagram of a receiver for the operator terminal of the system of FIG. 1.

Considering now the receiver 23 in greater detail with reference to FIG. 3, the receiver 23 is generally similar to the controller 18. The receiver 23 includes a programmable logic device 72 which communicates with the fiber-optic transmission line 11 via a Giga-bit fiber-optic transceiver 74 and a pair of transmitter and receiver link serializers 76 and 78 in a manner similar to the controller 18.

A micro controller unit 81 provides power-up data sequencing information for the programmable logic device 72, and controls a flat panel interface 83 for the flat panel display 27 via (FIG. 1) a power control circuit 85 which receives power sequencing from the micro controller unit 81 to provide the direct current power to the flat panel interface 83. A user brightness/contrast input 87 are connected to the micro controller unit 81 for controlling the brightness in contrast of the flat panel display 27. A backlight inverter control 89 receives control information from the micro controller unit 81 for in turn providing the backlight 92 for the flat panel display 27.

RGB video data intended for the flat panel display 27 and RS-232 serial port data is extracted from the incoming fiber-optic link 11. A return link transports the necessary RS-232 signals back to the PCI video controller board 18.

The micro-controller unit 81 performs general housekeeping tasks, and its primary task is to properly sequence power and data to the flat panel display 27 during link startup and shutdown. The flat panel display shuts down when the unit 81 has detected a LINK ERROR FLAG for 100 consecutive samples The unit 81 must then detect 100 consecutive samples without a LINK ERROR FLAG before it will power-up the flat display 27 panel again. The unit 81 also accepts user inputs for controlling a backlight invertor power supply. A backlight invertor power supply is required to energize florescent lights often used to back-light flat panel displays.

Figure 5:
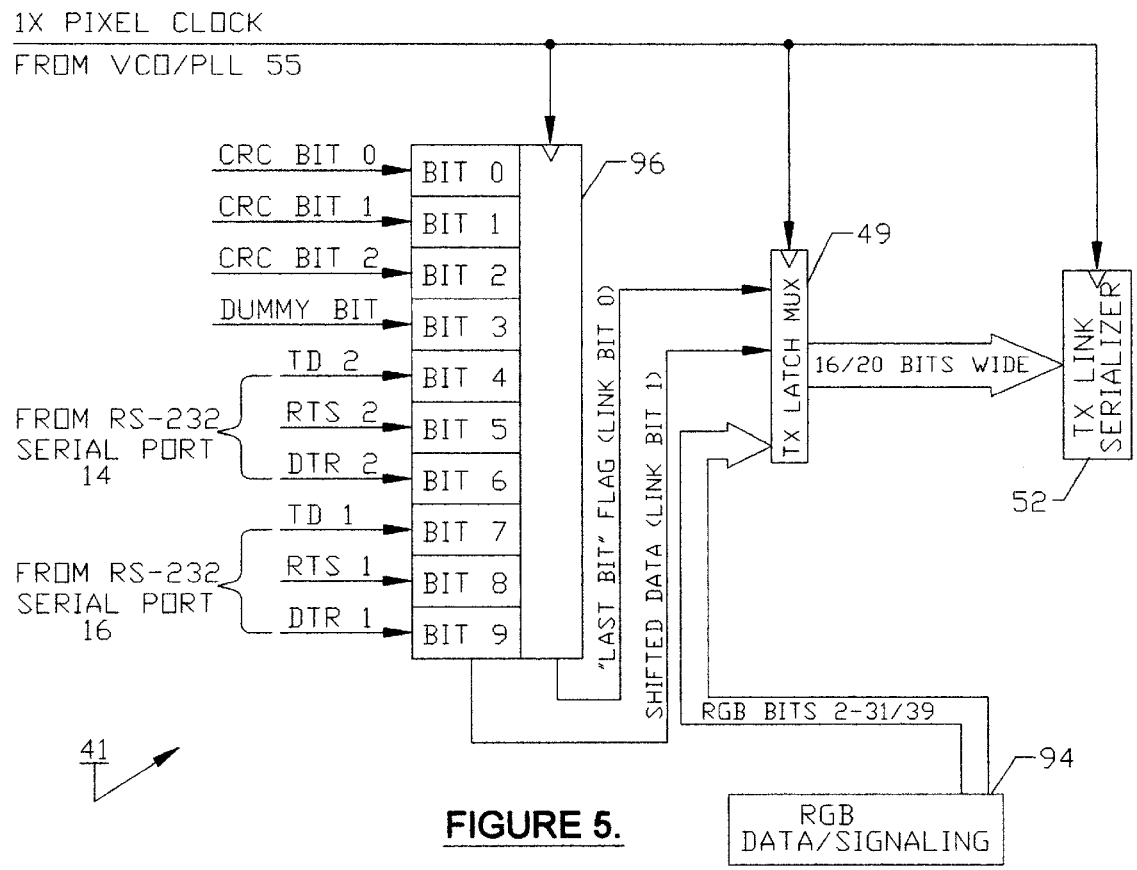
FIG. 5 is a block diagram of a portion of the programmable logic device.

Referring now to FIG. 5, the programmable logic device 41 will now be described in greater detail and is generally similar to the programmable logic device 72 of the receiver 23. The device 41 includes a RGB data/signaling logic 94 which provide link bits 2–15/19 to the transmission latch 49. A serial port logic 96 receives the bits of information from the serial ports 14 and 16 to provide 10 bits of information to the transmission latch 49, including a last bit flag (link bit 0) and a shifted data (link bit 1)

Figure 4:
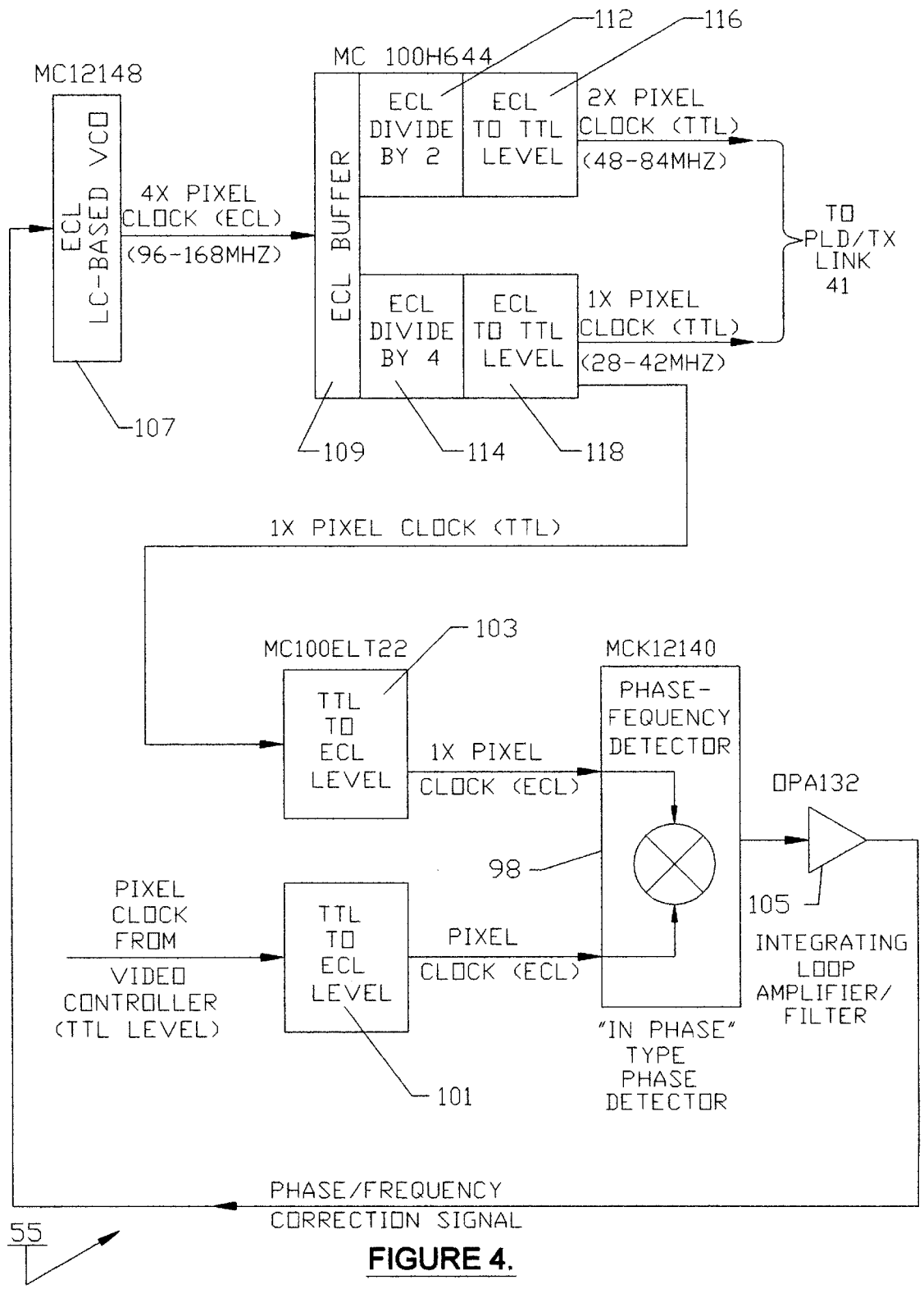
FIG. 4 is a block diagram of the voltage controlled oscillator phase lock loop of the controller card of FIG. 2.

Referring now to FIG. 4, considering now the voltage controlled oscillator/phase lock loop 55 in greater detail, an in-phase type phase detector 98 responds to a pixel clock signal from the video controller 43 via a pixel clock TTL to ECL level circuit 101 and compares it with a reference pixel clock signal received via a TTL to ECL level circuit 103. An integrating low-noise loop amplifier/filter 105 generates a phase/frequency correction signal generated by the detector 98 and supplies it to an input of an LC-based high-Q voltage controlled oscillator 107 for generating a 4× reference pixel clock signal and supplying it to an ECL buffer 109, for in turn having it divided by 2 and 4 respectively by an ECL to TTL level circuits 116 and 118 respectively by a minimum skew/delay clock integrated circuit MC100HG44.

The PCI video controller card 18 includes the special Type-II second-order Phase-Locked Loop unit 55 with its voltage-controlled oscillator 107 to increase the stability of the fiber-optic data link. It was discovered that the pixel clock of the video controller 181 which is designed to be directly interfaced to flat panel displays, inherently has too much jitter (phase noise) to be used as a reference for the high-frequency link clock. The loop bandwidth is set sufficiently low (approximately 700 Hz) in order to reduce phase noise to a point that the pixel clock is no longer a significant contributor to link bit-error rates.

Note that this circuit topology along with the use of ECL circuitry in the PLL design insures substantially minimum phase difference between the original pixel clock (PIXEL CLOCK from the video controller) and the filtered reference version, 1× PIXEL CLK. Minimum skew is also maintained between 1× PIXEL CLK and 2× PIXEL CLK. Minimum clock phase and skew differences are very important because the Red Blue Green (RGB) display data is being clocked out of the video controller 18 in relationship to the edges of PIXEL CLOCK.

Figure 6:
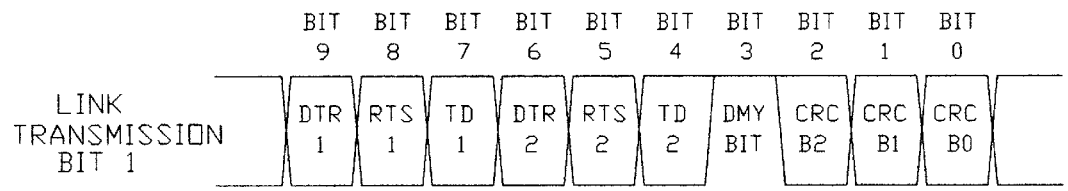
FIG. 6 illustrates wave diagrams useful in understanding the invention.
Figure 6:
Figure 6:
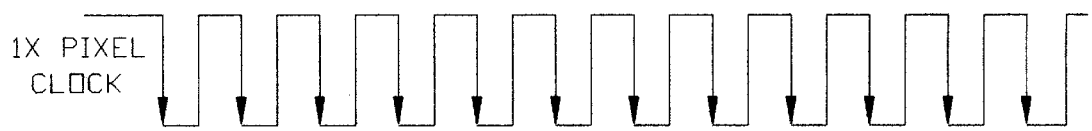
Figure 7:
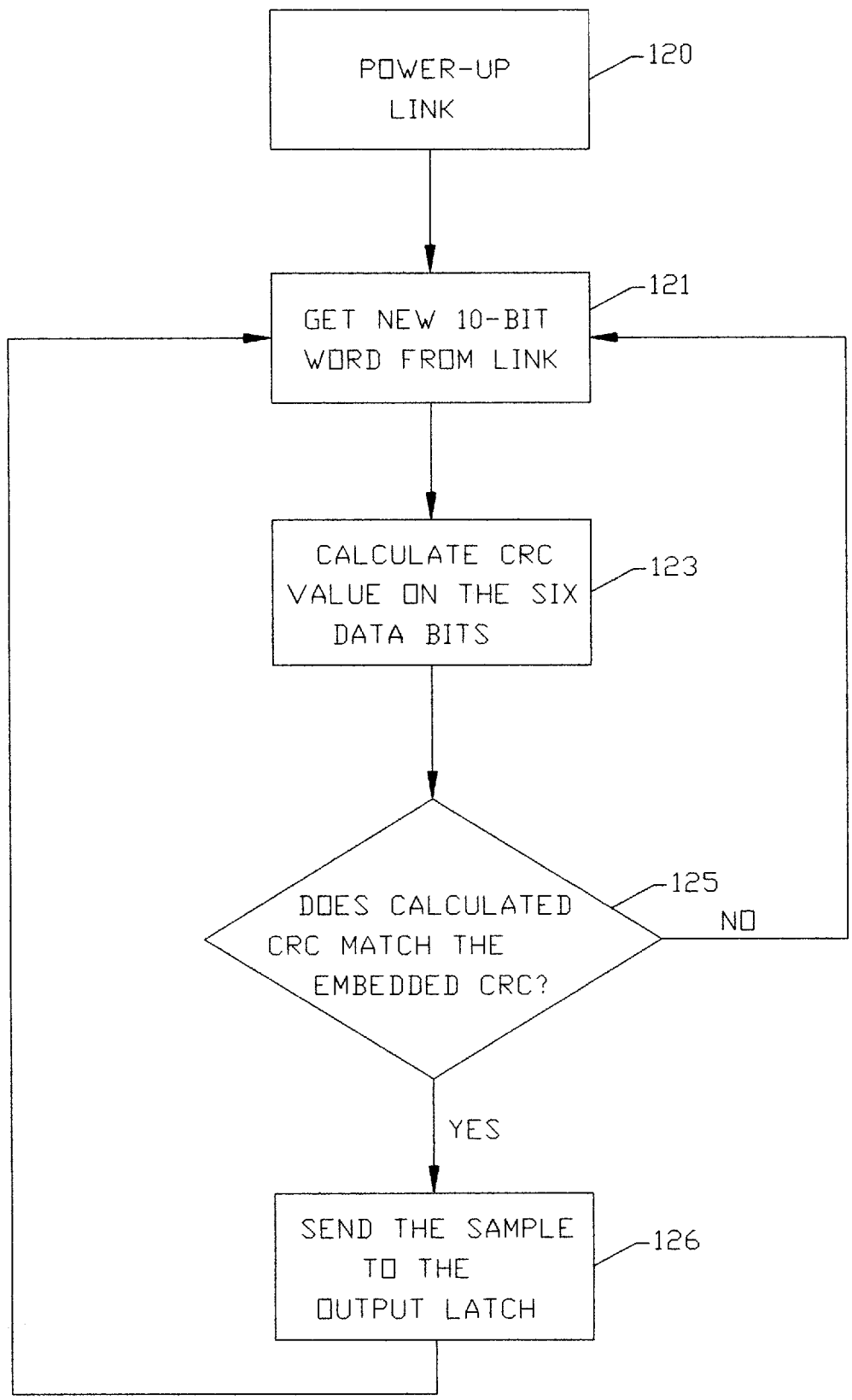
FIG. 7 is a flow chart of the inventive method of validating transmitted data.

Considering now the hot pluggable feature of the system 10 with reference to FIGS. 5, 6 and 7, the system 10 is designed to insure that the fiber-optic connection is hot-pluggable. This was done so the fiber-optic connection could be disconnected from a failed (or failing) computer 12 and then connected to a back-up computer (not shown) without the need for rebooting either computer. This feature is also used when upgrading software and/or hardware. Hot pluggability is accomplished by emulating idle serial port traffic (the link electronics "remembers" the state of the serial port signals just before the link disconnection/interruption) so neither the computer 12 nor the remote serial device "realize" that the two have been disconnected. Since the link transports two RS-232 serial ports, disconnecting the fiber-optic cable 11 is analogous to disconnecting copper-based RS-232 cables (not shown) from a computer. However, conventional copper-based connections do not emulate idle serial port traffic when physically disconnected.

The difficulty of maintaining the integrity of the RS-232 signals, and thus hot-pluggability, during a link-disconnect is compounded by the fact that the individual signals that comprise the RS-232 ports are serialized (multiplexed down to two of the link bits) in order to be sent down the fiber-optic link. Therefore, an inventive method of error-checking each sample group is embedded into each sample group.

A full hardware-handshaking implementation of RS-232 requires that a total of seven signal lines are connected between the computer (DTE) and the RS-232 serial device (DCE), such as a modem. Three signals (DTR, RTS, and RD and TD) are transmitted from the DTE to the DCE. Five signals (DCD, DSR, CTS, RI, and RD) are transmitted from the DCE to the DTE. FIGS. 5 and 6 show an example of how DTR, RTS and TD (from two RS-232 serial ports) are sent with error checking over the link. Only the two link transmission bits that are used for carrying the RS-232 traffic are shown in this example.

The system 10 transports the RS-232 signals by oversampling the signals a minimum of 30× (in the case of 115.2 Kbps data rates). In the present example, six signals are being sampled (DTR, RTS, and TD from the two RS-232 serial ports) in parallel as a six bit word, then one bit (fixed at a high logic level) and three Cycle Redundancy Check (CRC) bits are concatenated to the six bit word to make a new 10 bit word. The new 10 bit word containing error detection code is ready to be serialized for transmission over one of the link data bits. An additional link transmission bit is sent as a "last bit" flag that is used at the far end of the link to determine the beginning and end of each transmitted 10 bit word (FIGS. 5 and 6).

Once the 10 bit word is received at the remote side of the link 11, a CRC is performed on the six RS-232 bits. This CRC value is compared to the CRC value embedded in the 10 bit word. If the two CRC values match, the new RS-232 signal samples are allowed to pass to the output latch. If the two CRC values do not match, the previous "known-good" RS-232 signal samples are held in the output latch until an error-free sample is received. The flow chart in FIG. 7 shows the logical steps.

The same CRC approach is used in both directions of the link. As a result, the signal levels at the RS-232 ports on both sides of the link are maintained at the same level that they were just prior to the link's disconnection or disruption. This technique enables hot pluggability without concern for serial port software driver corruption or inadvertent transmission of errant data.

Referring now to FIG. 7, in order to provide the hot pluggable feature, as indicated in Box 120, the transmission line 11 must first be activated by applying power to the associated circuits. As indicated at Box 21, the transmission line link is monitored, and a new 10-bit word was received from the link.

As indicated in Box 123, once the 10-bit word is received (at either end of the link), the CRC value is calculated for the six data bits. Thereafter, as indicated at the decision Box 125, it is determined whether or not the calculated CRC matches the embedded CRC code. If it does not, then the method is repeated Box 121. If the match does occur, then as indicated at Box 126, the received sample is then sent to the appropriate output latch.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of controlling a remotely located computer from an operator terminal, comprising:

sending a message at one of the computer and the terminal over a fiber optic high speed transmission line via a link serializer to the other of the computer and the terminal, said message including data and an error checking information;

comparing the received error checking information with the received data;

deleting the message to ignore it as being faulty if a mismatch is determined; and maintaining subsequently the message at its last valid state to prevent the computer from inadvertently becoming disrupted either by the terminal or the computer being disconnected from said fiber optic transmission line during an idle condition of the computer, or by invalid data;

deriving a relatively stable reference clock signal from a pixel clock signal having a frequency at least equal to the pixel clock signal; and supplying the reference clock signal to the link serializer for causing it to generate a relatively stable link clock for controlling the sending of the message from the link serializer in a substantially stable manner.

2. A method according to claim 1, further including using a link serializer to send said message; deriving a relatively stable reference clock signal from a computer system pixel clock signal; and supplying the reference clock signal to a link serializer for causing it to generate a relatively stable link clock for controlling the sending of said message from the computer.

3. A method according to claim 2, wherein said deriving includes using a voltage controlled oscillator, generating said stable reference clock signal from the output of the oscillator, using a phase detector to respond to said stable reference clock signal and to the pixel clock signal to generate a phase/frequency correction signal to control the oscillator.

4. A method according to claim 3, wherein said error checking information includes cyclic redundancy check information.

5. A method of controlling, from an operator terminal, a remotely located computer system employing a video pixel clock signal, comprising:

sending a digital message from a link serializer via a fiberoptic transceiver to the operator terminal over a fiberoptic transmission line;

deriving a relatively stable reference clock signal from the pixel clock signal having a frequency at least equal to the pixel clock signal; and supplying the reference clock signal to the link serializer for causing it to generate a relatively stable link clock for controlling the sending of the message from the link serializer in a substantially stable manner.

6. A method according to claim 5, wherein said deriving includes using a voltage controlled oscillator, and generating said stable reference clock signal from the output of the oscillator.

7. A method according to claim 6, further including using a phase detector to respond to said stable reference clock signal and to the pixel clock signal to generate phase/frequency correction signal to control the oscillator.

8. A method according to claim 7, further including dividing the output of the oscillator by N.

9. A method according to claim 8, wherein said N is equal to two, the output of the oscillator being two times the pixel clock signal.

10. A method according to claim 8, wherein said N is equal to four, the output of the oscillator being four times the pixel clock signal.

11. A system for controlling a remotely located computer from an operator terminal, comprising:
means for sending a message at one of the computer and the terminal over a fiber optic high speed transmission line via a link serializer to the other of the computer and the terminal, said message including data and an error checking information;
means for comparing the received error checking information with the received data;
means for deleting the message to ignore it as being faulty if a mismatch is determined; and
means for maintaining subsequently the message at its last valid state to prevent the computer from inadvertently becoming disrupted either by the terminal or the computer being disconnected from said fiber optic transmission line during an idle condition of the computer, or by invalid data;
deriving a relatively stable reference clock signal from a pixel clock signal having a frequency at least equal to the pixel clock signal; and supplying the reference clock signal to the link serializer for causing it to generate a relatively stable link clock for controlling the sending of the message from the link serializer in a substantially stable manner.

12. A system according to claim 11, further including a link serializer to send said message; deriving a relatively stable reference clock signal from a computer system pixel clock signal; and supplying the reference clock signal to a link serializer for causing it to generate a relatively stable link clock for controlling the sending of said message from the computer.

13. A system according to claim 12, wherein said deriving includes using a voltage controlled oscillator, generating said stable reference clock signal from the output of the oscillator, using a phase detector to respond to said stable reference clock signal and to the pixel clock signal to generate a phase/frequency connection signal to control the oscillator.

14. A system according to claim 13, wherein said error checking information includes a cyclic redundancy check information.

15. A system for controlling, from an operator terminal, a remotely located computer system employing a video pixel clock signal, comprising:
a link serializer;
a fiberoptic transceiver;
a fiberoptic transmission line interconnecting in communication the transceiver and the operator terminal;
means for sending a digital message from the link serializer to the operator terminal;
means for deriving a relatively stable reference clock signal from the pixel clock signal having a frequency at least equal to the pixel clock signal; and
means for supplying the reference clock signal to the link serializer for causing it to generate a relatively stable link clock for controlling the sending of the message from the link serializer in a substantially stable manner.

16. A system according to claim 15, wherein said means for deriving includes a voltage controlled oscillator and means for generating said stable reference clock signal from the output of the oscillator.

17. A system according to claim 16, further including a phase detector to respond to said stable reference clock signal and to the pixel clock signal to generate phase/frequency correction signal to control the oscillator.

18. A system according to claim 17, further including a means for dividing the output of the oscillator by N.

19. A system according to claim 18, wherein said N is equal to two, the output of the oscillator being two times the pixel clock signal.

20. A system according to claim 18, wherein said N is equal to four, the output of the oscillator being four times the pixel clock signal.

* * * * *